Nov. 29, 1955    O. J. POUPITCH    2,724,882
HUB CAP CLIP
Filed April 14, 1953
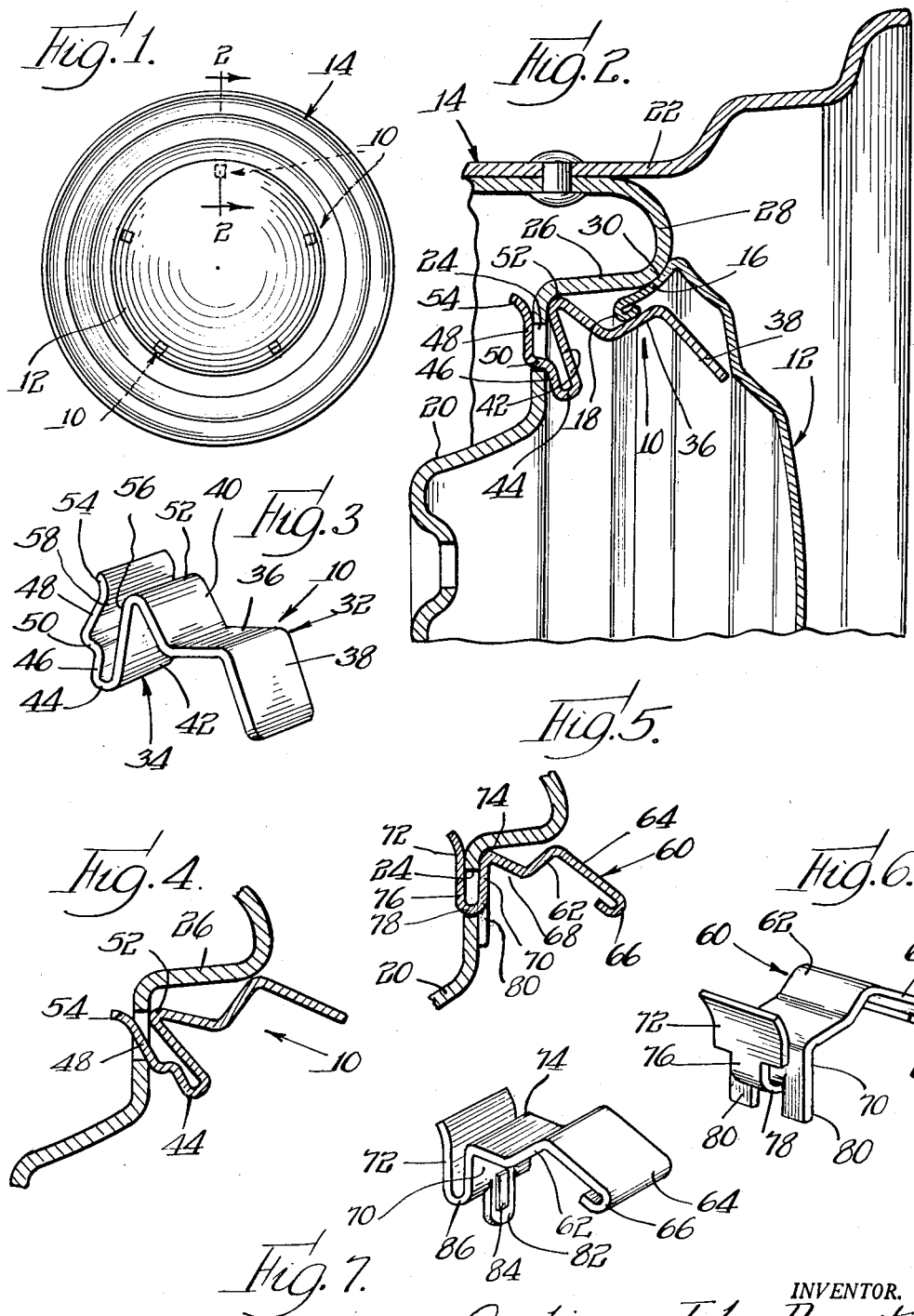
INVENTOR.
Ougljesa Jules Poupitch
BY
Moore Olson & Trexler
Attys.

United States Patent Office 2,724,882
Patented Nov. 29, 1955

2,724,882

HUB CAP CLIP

Ougljesa Jules Poupitch, Chicago, Ill., assignor to Illinois Tool Works, Chicago, Ill., a corporation of Illinois Application April 14, 1953, Serial No. 348,614

7 Claims. (Cl. 24—73)

The present invention relates to a novel mounting clip, and more particularly to a novel clip for mounting hub caps and the like to wheels.

As is well known, there are various sizes of hub caps which may be applied to automobile wheels, which hub caps are usually secured to the wheels by means of mounting clips. In general, the practice has been to attach such hub cap mounting clips to the disk portion of the automobile wheel by means of welding or riveting. In order to effect manufacturing economies in producing automobile wheels by mass production, all of the wheels are initially provided with mounting clips disposed to receive a standard relatively small size hub cap. In the event it is ultimately determined that the buyer prefers another size of hub cap, and more particularly relatively large hub caps, it is necessary to remove the mounting clips. Since the clips have been welded or riveted to the wheel disk, such removal is relatively difficult and time consuming, and also creates a danger of injuring the wheel. It is, therefore, an object of this invention to provide a novel mounting clip which may be quickly and easily assembled with or removed from the wheel and which can be installed on the wheel at any desired point along the automobile assembly line, and preferably after a determination has been made as to which size hub cap is to be used on the particular wheel.

Another object of the present invention is to provide a novel mounting clip of the above described type which may be easily installed on a wheel without the need for auxiliary securing means, such as welds or rivets.

Still another object of the present invention is to provide a novel mounting clip of the above described type which may be quickly and economically manufactured from sheet stock.

Other objects and advantages of this invention will become apparent from the following description and the accompanying drawings, wherein:

Fig. 1 is a side elevational view, showing a wheel and a hub cap mounted thereon by means of the novel mounting clips of this invention;

Fig. 2 is an enlarged fragmentary vertical cross sectional view taken along line 2—2 in Fig. 1;

Fig. 3 is a perspective view illustrating the novel mounting clip shown in Fig. 2;

Fig. 4 is a fragmentary cross sectional view similar to Fig. 2, but showing the method of assembling the novel mounting clip with the wheel;

Fig. 5 is a fragmentary cross sectional view similar to Fig. 2, but showing a modified form of the present invention;

Fig. 6 is a perspective view, illustrating the mounting clip of Fig. 5; and

Fig. 7 is a perspective view, illustrating a novel mounting clip embodying another modified form of this invention.

Referring now more specifically to the drawings, wherein like parts are designated by the same numerals throughout the various figures, a mounting clip 10 embodying the principles of this invention is shown best in Figs. 2 and 3 for mounting a hub cap 12 onto a standard automobile wheel 14. The hub cap 12 may be of any standard form, and, therefore, need not be described in detail so that it suffices to say that the hub cap is provided with a marginal inwardly directed flange 16 adapted to interengage with the mounting clip in the manner described below. Preferably, the terminal edge of the hub cap flange 16 is bent over to provide a rigidifying bead 18. The wheel 14 is also of any standard design and includes a disk 20 and a rim 22 secured to the disk in the usual manner. The disk 20 is provided with a plurality of openings or apertures 24 for receiving a mounting clip in the manner described below. Generally, the disk 20 is also formed with a generally axially extending annular portion 26 which is looped, as at 28, to provide an annular abutment surface 30 so that the flange 16 of the hub cap will be held between the abutment surface 30 and the mounting clip in the manner illustrated best in Fig. 2.

The mounting clip 10 is preferably manufactured from a single piece of resilient sheet stock, such as spring steel. The sheet stock is formed to provide a hub cap engaging and retaining portion 32 and a clip attachment portion 34.

The hub cap engaging and retaining portion of the mounting clip comprises a pair of angularly disposed sections 36 and 38. As shown best in Fig. 2, these sections extend generally outwardly from the outer face of the wheel disk when the clip is in its mounted position with the section 36 being inclined generally radially outwardly from the axis of the wheel for interengagement with the flange 16 of the hub cap. The free end section 38 of the clip is inclined generally radially inwardly with respect to the wheel axis and provides a guide and cam surface for guiding the peripheral edge of the hub cap into engagement with the section 36.

The attachment portion 34 of the mounting clip includes a spacing section 40 integral with the inner end of the hub cap engaging section 36. The section 40 is inclined or angularly disposed so as to space the section 36 from the annular portion 26 of the wheel disk sufficiently to enable the hub cap to be assembled as in Fig. 2. A section 42 extends at an acute angle from the section 40 and is long enough to extend across the aperture or opening 24 in the wheel disk. The section 42 is looped, as at 44, and doubled back, as at 46 so that when the clip is assembled with the wheel, the portion 46 will engage the outer surface of the disk at one side of the aperture 24, and the opposite end of the section 42 will engage the outer surface of the disk at the opposite side of the aperture 24. A hooking section 48 extends from the portion 46 and is adapted to extend through the aperture 24 and engage the inner surface of the wheel disk as illustrated in Fig. 2. The section 48 is bent so as to provide an abutment portion 50, which abutment portion is adapted to engage one side or surface of the wheel disk defining the aperture 24. It should be noted that the junction between the sections 40 and 42 indicated at 52 provides a second abutment surface which is adapted to engage the annular portion 26 of the wheel disk. The engagement of these oppositely facing abutment surfaces or portions of the clip with the wheel disk in combination with the engagement of sections 42 and 48 with the outwardly and inwardly facing surfaces of the wheel disk securely fastens the clip to the wheel disk so as to prevent inadvertent or accidental removal.

In order to assemble the mounting clip 10 with the wheel disk, the clip is first applied to the disk in the position shown in Fig. 4. In this position, the section 48 extends through the aperture 24, and it should be noted that the combined lengths of the section 48 and the portion 46 are greater than the length of the section 42, whereby the terminal end of the section 48 projects beyond the end of the section 42 at the junction 52. This greatly facilitates the insertion of the end of the section 48 through the aperture and engagement of the section 48 under the wheel disk. In addition, it should be noted that the terminal end of the section 48 is flared away from the section 42, as at 54, in order to provide a cam surface for guiding the section 48 through the aperture. With the clip in the position shown in Fig. 4, it is merely necessary to press inwardly on the looped end 42, whereupon the inherent resiliency of the sheet material stock of the clip permits the sections 42 and 48 to flex sufficiently to enable the clip to assume the position shown in Fig. 2. In this embodiment, the loop portion 44 greatly facilitates the flexing of the section 48 during the application of the clip to the wheel. Preferably, the sections 42 and 48 are formed so that the distance therebetween at points 56 and 58 is normally slightly less than the thickness of the wheel disk, whereby the disk will be resiliently clamped between these sections. In addition, the distance between the oppositely facing abutment surfaces 50 and 52 is normally slightly greater than the distance between the surfaces of the wheel disk engaged by these abutments, whereby these abutments are resiliently urged into engagement with the wheel disk when the clip is in its assembled position. The novel clip 10 of this invention thus resiliently engages two pairs of opposed surfaces on the wheel disk with the surfaces of the one pair angularly disposed with respect to the surfaces of the other pair. One of these pairs of surfaces is, of course, provided by the inner and outer surfaces of the wheel disk, and the other pair is provided by one side of the aperture 24 and the annular portion 26 of the wheel disk.

Figs. 5 and 6 illustrate a mounting clip 60 embodying a modified form of this invention. The mounting clip 60 includes a hub cap engaging and retaining portion having sections 62 and 64 which are substantially identical to the above described sections 36 and 38, respectively. However, in this modification, the outer free end of the section 64 is looped or folded, as at 66, to provide a rounded end over which the hub cap may slide without catching. It is understood that the outer end of the clip 10 may also be rounded or looped if desired.

The attachment portion of the clip 60 also includes a spacing section 68 similar to the above described section 40. In this modification, the above described sections 42 and 48 have been replaced by sections 70 and 72. The section 70 extends from a junction 74 with the section 68 at an angle which permits the section 70 to conform closely to the surface of the wheel disk 20. The section 72 is connected with the section 70 by a looped portion 76 which is struck from the section 70, as shown best in Fig. 6. This looped portion 76 has substantially reduced cross sectional dimensions as compared with the remainder of the clip, whereby the flexibility of the looped section is increased to facilitate the application of the clip to a wheel. By striking the looped portion 76 from the section 70, a pair of fingers 80 is provided which extend across the opening or aperture 24 in the wheel disk. The looped portion 76 provides an abutment surface 78 engageable with one side of the aperture 24 to retain the clip in assembled relationship with the wheel. The attachment portion of the clip 60 functions in substantially the same manner as the attachment portion of the above described clip 10, and, therefore, such function need not be described again.

Fig. 7 shows another modified form of this invention which is substantially identical to the above described mounting clip 60, as indicated by the application of identical numerals to identical parts. However, in this embodiment, the relationship of the above described fingers 80 and the looped portion 76 has been reversed so that only a single centrally located finger 82 is provided, which finger is struck from the material of the looped section 86.

The finger 82 may be embossed or raised, as at 84, in order to add additional strength and rigidity. Preferably, the embossment extends past the junction of the looped portion with the section 70, as illustrated.

When it is desired to mount a hub cap on a wheel, the novel clips of this invention are first assembled with the wheel disk in the manner described hereinabove. A plurality of the mounting clips are used, and in Fig. 1, five clips spaced evenly around the wheel disk have been illustrated. The hub cap is then centered with the wheel and applied to the mounting clips in the usual manner. As the hub cap is pressed inwardly over the clips, the beaded edge 18 of the hub cap engages the guide or cam portions 38 of the clips and causes the holding portions of the clips to flex inwardly, thereby permitting the hub cap to engage under the sections 36. The spacing section 40 or 68 of the clips have the additional function of providing increased resiliency to facilitate the assembly of a hub cap. After the hub caps have been moved to the position shown in Fig. 2, the resiliency of the mounting clips causes the hub cap to be securely held between the sections 36 and the abutment 30 on the wheel disk.

From the above description, it is seen that the present invention has provided a simple and economical sheet material mounting clip which may be easily assembled with a suitable wheel. More particularly, it is seen that the present invention has provided a novel clip which may be assembled with a wheel without using additional securing means, such as rivets or welds, and which may be quickly and easily removed from the wheel if desired.

While the preferred embodiments of the present invention have been shown and described herein, it is obvious that many structural details may be changed without departing from the spirit and scope of the appended claims.

I claim:

1. A one piece resilient sheet material clip adapted to be detachably secured to an apertured wheel for mounting a hub cap or the like on the wheel, said clip comprising an outer hub cap retaining portion extending generally outwardly from the wheel when the clip is secured thereto, and an inner two section attachment portion integral with and formed as a continuation of said retaining portion; said attachment portion including a first section connected with and projecting from said retaining portion across an aperture in the wheel and having an abutment means to engage the wheel surface adjacent the aperture therethrough, a second section on said attachment portion extending from the first mentioned section and having a free end portion extending generally along the first mentioned section and in the opposite direction for projection into the wheel aperture and engagement with the opposite face of the wheel, and means providing a second abutment on said second section for engaging the wall of the wheel aperture in opposition to the first mentioned abutment means.

2. A one piece resilient sheet material clip as claimed in claim 7, wherein said second section is connected with said first section medially of the ends of the said first section.

3. A one piece resilient sheet material clip as claimed in claim 1, wherein said second section is connected to said first section through the said second abutment.

4. A one piece resilient sheet material clip as claimed in claim 1, wherein the free end portion of said second section comprises a cam for guiding said second section into the wheel aperture.

5. A one piece resilient sheet material clip as claimed in claim 1, wherein said second section is connected with said first section by a relatively flexible looped portion.

6. A one piece resilient sheet material clip as claimed in claim 1, wherein said first section includes a portion having relatively wide cross sectional dimensions and a finger-like portion having relatively narrow cross sectional dimensions; and wherein a relatively flexible connecting portion with relatively narrow cross sectional dimensions connects said second section to said first section.

7. A one piece resilient sheet material clip as claimed in claim 1, wherein there is provided a dependent portion below said second abutment for engaging the wheel surface adjacent the area of engagement between the second abutment and the wall of the wheel aperture.

References Cited in the file of this patent

UNITED STATES PATENTS

| | | |
|---|---|---|
| 2,451,591 | Tinnerman | Oct. 19, 1948 |
| 2,547,031 | Lyon | Apr. 3, 1951 |
| 2,566,886 | Hartman | Sept. 4, 1951 |
| 2,596,346 | Soltysik | May 13, 1952 |
| 2,618,033 | Tinnerman | Nov. 18, 1952 |